United States Patent

Korogi

(10) Patent No.: US 9,939,273 B2
(45) Date of Patent: Apr. 10, 2018

(54) ATTITUDE ESTIMATING DEVICE, ATTITUDE ESTIMATING METHOD, AND STORAGE MEDIUM

(71) Applicant: SITE SENSING INC., Tokyo (JP)

(72) Inventor: Masakatsu Korogi, Tokyo (JP)

(73) Assignee: SITE SENSING INC., Tokyo (JP)

( * ) Notice: Subject to any disclaimer, the term of this patent is extended or adjusted under 35 U.S.C. 154(b) by 0 days.

(21) Appl. No.: 15/169,875

(22) Filed: Jun. 1, 2016

(65) Prior Publication Data

US 2017/0336208 A1 Nov. 23, 2017

(30) Foreign Application Priority Data

May 20, 2016 (JP) ................ 2016-101925

(51) Int. Cl.
G01C 21/06 (2006.01)
G01C 21/14 (2006.01)
G01C 21/16 (2006.01)
G01C 21/08 (2006.01)

(52) U.S. Cl.
CPC ............ *G01C 21/08* (2013.01); *G01C 21/14* (2013.01); *G01C 21/165* (2013.01)

(58) Field of Classification Search
CPC ....... G01C 21/08; G01C 21/14; G01C 21/165
USPC ........................................... 701/525
See application file for complete search history.

(56) References Cited

U.S. PATENT DOCUMENTS

| 8,751,151 B2* | 6/2014 | Funk ............... 340/539.13 |
| 9,146,113 B1* | 9/2015 | Funk | |
| 2010/0174506 A1* | 7/2010 | Joseph ............... G01C 21/165 702/141 |
| 2011/0105957 A1 | 5/2011 | Kourogi et al. |
| 2011/0106487 A1 | 5/2011 | Kourogi |
| 2012/0237086 A1 | 9/2012 | Kourogi et al. |
| 2013/0158940 A1* | 6/2013 | Crane, III ............... G01C 9/02 702/141 |
| 2013/0332064 A1* | 12/2013 | Funk ............... G01C 21/206 701/409 |
| 2014/0336970 A1* | 11/2014 | Troni-Peralta ......... G01C 25/00 702/96 |

OTHER PUBLICATIONS

Kourogi, Masakatsu et al, Indoor positioning system using a self-contained sensor module for pedestrian navigation and its evaluation, 2008, pp. 151-156.
Paul Zarchan, Howard Musoff, "Fundamentals of Kalman Filtering: A Practical Approach—Second Edition", AIAA, 2004.

* cited by examiner

*Primary Examiner* — Yazan A Soofi
(74) *Attorney, Agent, or Firm* — Kristina Castellano; Castellano PLLC

(57) ABSTRACT

The present invention reduces an arithmetic operation amount for updating a state vector. The attitude estimating device includes (i) a gravitational direction estimating section for updating, by using an acceleration vector as an observation, a gravitational direction vector predicted from an angular velocity vector, (ii) a horizontal direction estimating section for updating, by using a magnetic vector as an observation, a horizontal direction vector predicted from the angular velocity vector, and an attitude estimating section for generating attitude information with use of the gravitational direction vector and the horizontal direction vector.

6 Claims, 3 Drawing Sheets

ATTITUDE ESTIMATING DEVICE, ATTITUDE ESTIMATING METHOD, AND STORAGE MEDIUM

This Nonprovisional application claims priority under 35 U.S.C. § 119 on Patent Application No. 2016-101925 filed in Japan on May 20, 2016, the entire contents of which are hereby incorporated by reference.

TECHNICAL FIELD

The present invention relates to a device and the like for tracking an attitude of a moving body with use of outputs from an accelerometer, an angular rate sensor, and a magnetometer which are held on the moving body.

BACKGROUND ART

A technique specialized in measuring a position and a direction in walking actions with use of self-contained sensors (such as an accelerometer, a gyro sensor, a magnetometer, and a pressure sensor) worn on a hip, a toe, and the like of a human is called pedestrian dead reckoning (PDR). As disclosed in Non-patent Literature 1, such a technique has conventionally been studied. In such a technique, real time tracking is carried out by sequentially updating a state vector of a moving body with use of a Kalman filter.

CITATION LIST

Non-Patent Literature

[Non-Patent Literature 1]
Masakatsu Korogi, Takashi Okuma, Takeshi Kurata, "Indoor Positioning System Using Self-contained Sensor Module for Pedestrian Navigation And Evaluation Thereof" in Compilation of Abstracts of Papers for Symposium "Mobile 08", pp. 151-156, 2008

[Non-Patent Literature 2]
Paul Zarchan, Howard Musoff, "Fundamentals of Kalman Filtering: A Practical Approach—Second Edition", AIAA, 2004.

SUMMARY OF INVENTION

Technical Problem

However, the conventional technique has a problem that a cost of arithmetic operation carried out with the Kalman filter is large. That is, in the technique of Non-patent Literature 1, tracking in a gravitational direction and in a horizontal reference direction is carried out with use of the Kalman filter whose state vector is expressed by a matrix of 9×1 including nine components in total, i.e., true north direction components (in three axes), vertical direction components (in three axes), and angular velocity components (in three axes). From this, update of the state vector has required multiplication of a matrix of 9×9 and arithmetic operation using an inverse matrix of the matrix of 9×9, and thus a cost of such arithmetic operation is large. Note that this problem is not limited to the pedestrian dead reckoning and may also occur in tracking of an attitude of any moving body.

The present invention is accomplished in view of the problem, and an object of the present invention is to provide an attitude estimating device and the like which can reduce an arithmetic operation cost for update of a state vector without lowering accuracy in attitude estimation.

Solution to Problem

In order to attain the object, an attitude estimating device of the present invention is an attitude estimating device which (i) sequentially updates a state vector of a moving body in a sensor coordinate system by use of an output from an accelerometer, an output from an angular rate sensor, and an output from a magnetometer and (ii) tracks an attitude of the moving body with use of the state vector, the attitude estimating device including: a gravitational direction estimating section which (i) calculates a predicted value of a gravitational direction vector that is a component of the state vector with use of the output from the angular rate sensor and (ii) updates the predicted value of the gravitational direction vector by using the output from the accelerometer as an observation; a horizontal direction estimating section which (i) calculates a predicted value of a horizontal direction vector that is a component of the state vector with use of the output from the angular rate sensor and (ii) updates the predicted value of the horizontal direction vector by using the output from the magnetometer as an observation; and an attitude estimating section which generates attitude information of the moving body with use of (i) the gravitational direction vector which has been updated and (ii) the horizontal direction vector which has been updated.

In order to attain the object, an attitude estimating method of the present invention is an attitude estimating method which is carried out by use of an attitude estimating device which (i) sequentially updates a state vector of a moving body in a sensor coordinate system by use of an output from an accelerometer, an output from an angular rate sensor, and an output from a magnetometer and (ii) tracks an attitude of the moving body with use of the state vector, the attitude estimating method including: a gravitational direction estimating step of (i) calculating a predicted value of a gravitational direction vector that is a component of the state vector with use of the output from the angular rate sensor and (ii) updating the predicted value of the gravitational direction vector by using the output from the accelerometer as an observation; a horizontal direction estimating step of (i) calculating a predicted value of a horizontal direction vector that is a component of the state vector with use of the output from the angular rate sensor and (ii) updating the predicted value of the horizontal direction vector by using the output from the magnetometer as an observation; and an attitude estimating step of generating attitude information of the moving body with use of (i) the gravitational direction vector which has been updated and (ii) the horizontal direction vector which has been updated.

Advantageous Effects of Invention

The present invention brings about an effect of reducing an arithmetic operation cost for update of a state vector without lowering accuracy in attitude estimation.

DESCRIPTION OF EMBODIMENTS

[Embodiment 1]

Figure 1:
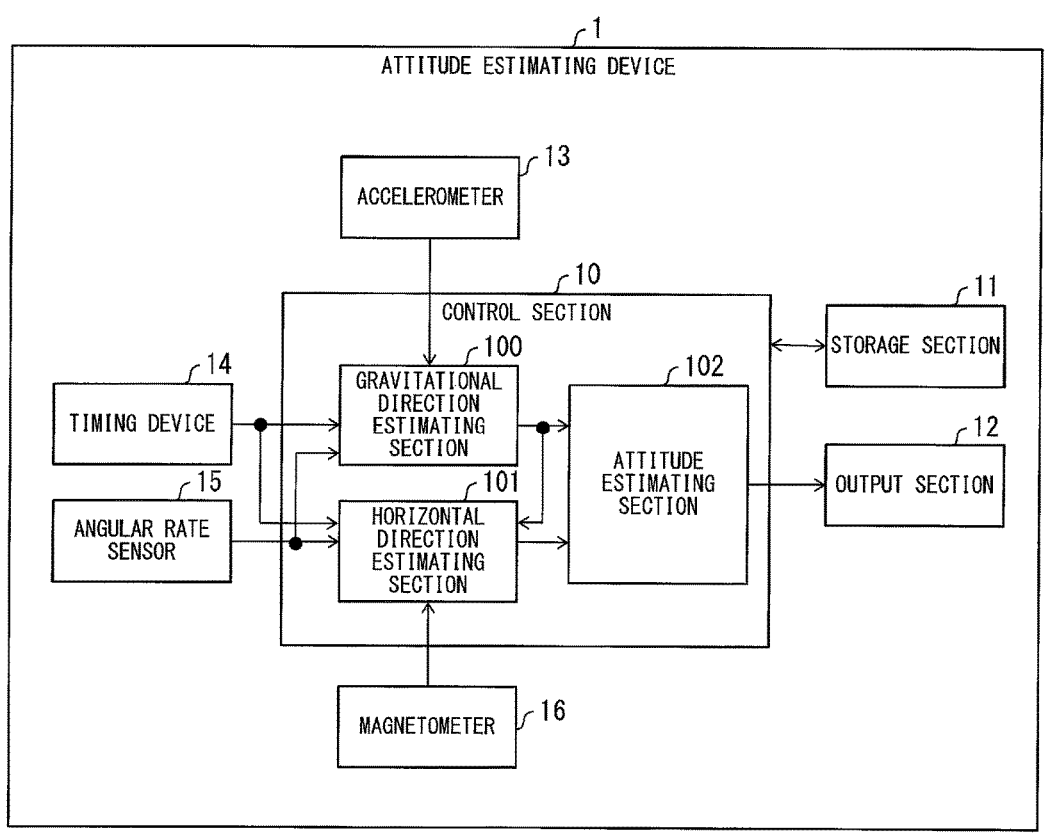
FIG. 1 is a block diagram illustrating an example of a configuration of maim parts in an attitude estimating device in accordance with Embodiment 1 of the present invention.
Figure 2:
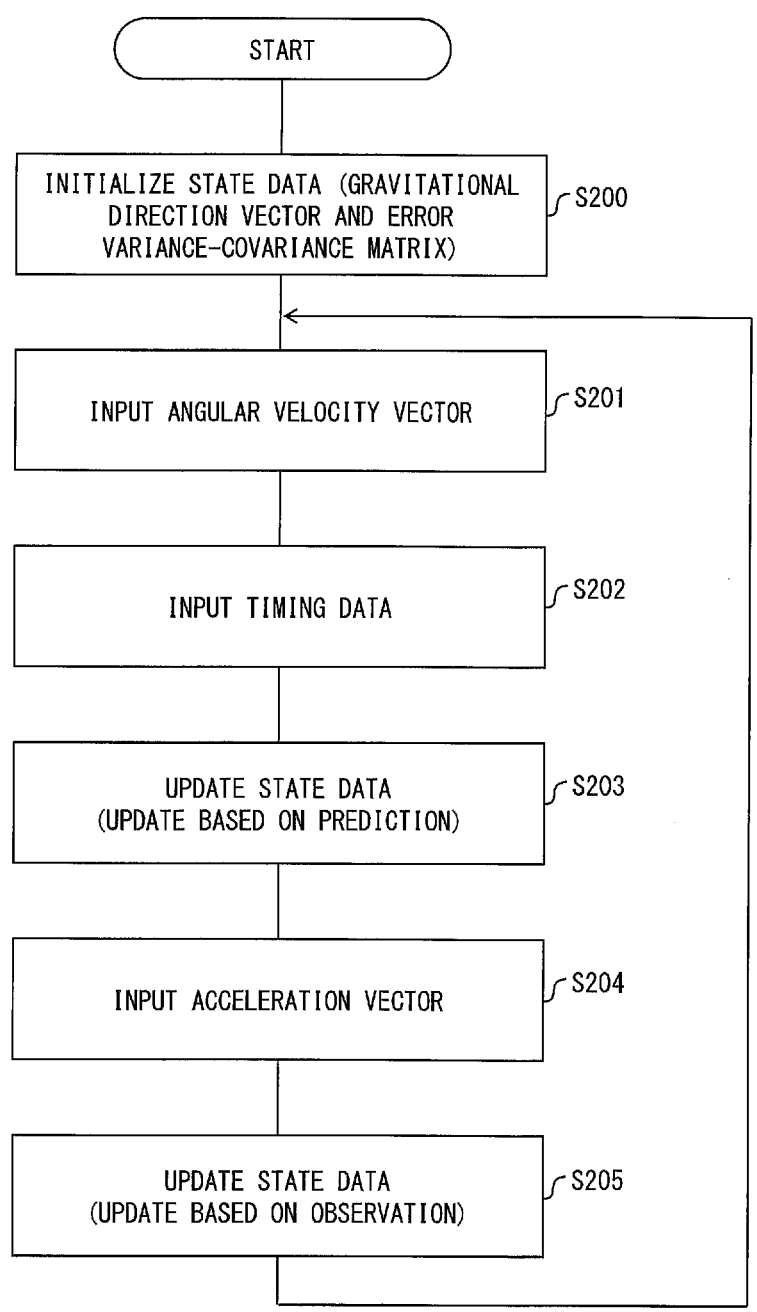
FIG. 2 is a flowchart showing an example of processes carried out by a gravitational direction estimating section.
Figure 3:
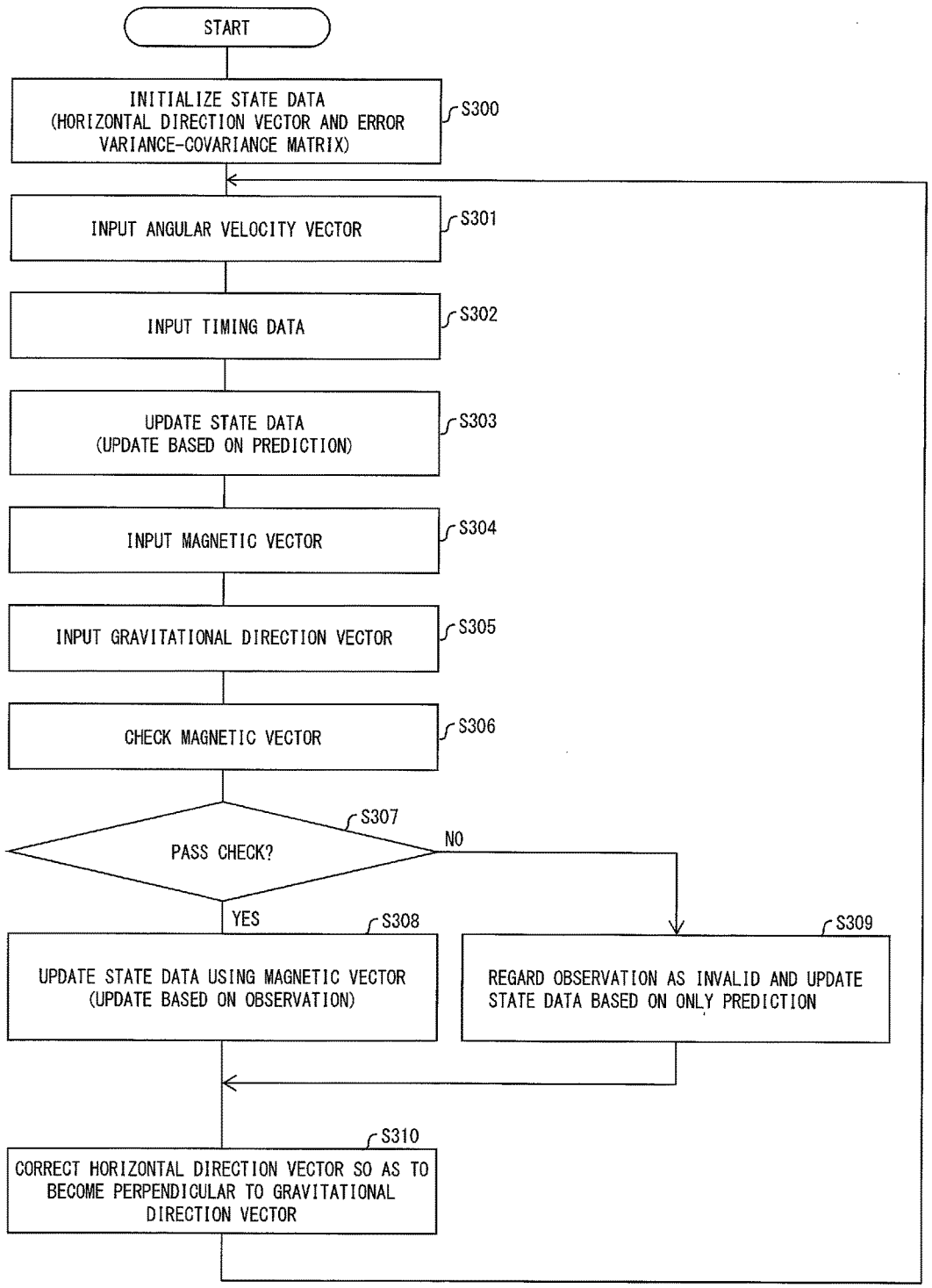
FIG. 3 is a flowchart showing an example of processes carried out by a horizontal direction estimating section.

The following description will discuss an embodiment of the present invention with reference to FIGS. 1 through 3. FIG. 1 is a block diagram illustrating an example of a configuration of main parts in an attitude estimating device 1 in accordance with Embodiment 1. The attitude estimating device 1 is a device which (i) is held on a moving body whose attitude is to be estimated and (ii) tracks an attitude of the moving body. As illustrated in FIG. 1, the attitude estimating device 1 includes a control section 10, a storage section 11, an output section 12, an accelerometer 13, a timing device 14, an angular rate sensor 15, and a magnetometer 16.

The control section 10 comprehensively controls sections in the attitude estimating device 1 and includes a gravitational direction estimating section 100, a horizontal direction estimating section 101, and an attitude estimating section 102. The storage section 11 stores various data used by the attitude estimating device 1, and the output section 12 outputs attitude information indicative of an attitude estimated by the attitude estimating section 102. An aspect of the output of the output section 12 is not limited to a particular one and can be a display output. In such a case, the output section 12 is a display device. Alternatively, the output of the output section 12 can be an output to another device (e.g., a positioning device which calculates a position of the moving body with use of attitude information) and, in such a case, the output section 12 is a communication device or a communication interface.

The accelerometer 13 is a sensor device which measures an acceleration vector in three axes directions in a sensor coordinate system and supplies the acceleration vector to the control section 10. The acceleration vector (i.e., output of the accelerometer 13) which is supplied from the accelerometer 13 to the control section 10 is expressed as follows.

[Math. 1]

$$\vec{a} = (a_x, a_y, a_z)^T$$

Note that the sensor coordinate system is a coordinate system which is defined by three axes directions of the acceleration vector outputted by the accelerometer 13. Here, the accelerometer 13, the angular rate sensor 15, and the magnetometer 16 can measure sensor data in the same sensor coordinate system or are assumed to be capable of measuring sensor data in the same sensor coordinate system. Moreover, it is premised that, even if the sensors are provided in respective different coordinate systems, measurement results in one virtual sensor coordinate system are supplied to the control section 10.

The timing device 14 is a device which measures a timing at which sensor data is obtained. Specifically, the timing device 14 detects (i) a timing at which the accelerometer 13 has obtained an acceleration vector, (ii) a timing at which the angular rate sensor 15 has obtained an angular velocity vector, and (iii) a timing at which the magnetometer 16 has obtained a magnetic vector. Then, the timing device 14 supplies, to the control section 10, timing data which indicates a time interval $\Delta t$ of obtaining sensor data. The time interval $\Delta t$ can also be said as a discrete time difference between samples (i.e., pieces of sensor data) which have been temporally sequentially obtained. Note that the timing device 14 is not limited to a particular one, provided that the timing device 14 is a device which outputs timing data from which the time interval $\Delta t$ can be calculated. For example, the timing device 14 can be a device which measures and outputs an absolute time. Note that the sensors do not necessarily obtain respective pieces of sensor data simultaneously.

The angular rate sensor 15 is a sensor device which measures an angular velocity vector in three axes directions in the sensor coordinate system and supplies the angular velocity vector to the control section 10. The angular velocity vector (i.e., output of the angular rate sensor 15) which is supplied from the angular rate sensor 15 to the control section 10 is expressed as follows.

[Math. 2]

$$\vec{\omega} = (\omega_x, \omega_y, \omega_z)^T$$

The magnetometer 16 is a sensor device which measures a magnetic vector in three axes directions in the sensor coordinate system and supplies the magnetic vector to the control section 10. The magnetic vector (i.e., output of the magnetometer 16) which is supplied from the magnetometer 16 to the control section 10 is expressed as follows.

[Math. 3]

$$\vec{m} = (m_x, m_y, m_z)^T$$

The gravitational direction estimating section 100 sequentially updates a state vector of the moving body in the sensor coordinate system. More specifically, the gravitational direction estimating section 100 holds a gravitational direction vector in the sensor coordinate system as state data (state vector), updates (estimates) the gravitational direction vector, and outputs the gravitational direction vector. The gravitational direction vector can be expressed also as a vertical direction vector. The gravitational direction estimating section 100 estimates the gravitational direction vector based on sensor data (3-axis acceleration vector and 3-axis angular velocity vector) in the sensor coordinate system and a time interval $\Delta t$ of obtaining the sensor data (details will be described later).

The gravitational direction estimating section 100 holds, as internal state data, at least a state vector (specifically, gravitational direction vector) and an error variance-covariance matrix $P_g$ of the state vector. In this example, the gravitational direction vector is expressed by a matrix of 3×1 as described below, and therefore an error variance-covariance matrix is a square matrix of 3×3. The gravitational direction estimating section 100 processes these pieces of state data in accordance with a framework of a Kalman filter. The gravitational direction vector is expressed as follows.

[Math. 4]

$$\vec{g} = (g_x, g_y, g_z)^T$$

The horizontal direction estimating section 101 sequentially updates a state vector of the moving body in the sensor coordinate system. More specifically, the horizontal direction estimating section 101 holds a horizontal direction vector in the sensor coordinate system as state data (state vector), updates (estimates) the horizontal direction vector, and outputs the horizontal direction vector. The horizontal direction estimating section 101 estimates the horizontal direction vector based on sensor data (3-axis acceleration vector, 3-axis angular velocity vector, and 3-axis magnetic vector) in the sensor coordinate system and a time interval $\Delta t$ of obtaining the sensor data (details will be described later).

The horizontal direction estimating section 101 holds, as internal state data, at least a state vector (specifically, horizontal direction vector) and an error variance-covariance matrix $P_h$ of the state vector. In this example, the horizontal direction vector is expressed by a matrix of 3×1 as described below, and therefore an error variance-covariance matrix is a square matrix of 3×3. The horizontal direction estimating section 101 processes these pieces of state data in accordance with the framework of the Kalman filter. The horizontal direction vector is expressed as blow. The horizontal direction vector is a unit vector indicative of a criterion in the horizontal direction. Note that the criterion in the horizontal direction is a horizontal direction vector indicating a true north direction, and therefore the horizontal direction vector can also be expressed as a true north direction vector.

[Math. 5]

$$\vec{h} = (h_x, h_y, h_z)^T$$

The attitude estimating section 102 generates attitude information, which is indicative of an attitude of the moving body, based on the gravitational direction vector and the horizontal direction vector in the sensor coordinate system. Specifically, the attitude estimating section 102 first calculates an outer product vector (as below) of (i) a gravitational direction vector (which has been updated) which is state data held by the gravitational direction estimating section 100 and (ii) a horizontal direction vector (which has been updated) which is state data held by the horizontal direction estimating section 101.

[Math. 6]

$$\vec{s} = \vec{g} \times \vec{h} = (s_x, s_y, s_z)^T$$

The attitude estimating section 102 generates, with use of the outer product vector, a rotation matrix R (i.e., attitude information) expressed by a mathematical formula (1) below. By using the rotation matrix R, it is possible to convert an attitude in the sensor coordinate system into an attitude in a world coordinate system. Moreover, the rotation matrix R can be used also in pedestrian dead reckoning (PDR) and the like. Note that the attitude information generated by the attitude estimating section 102 is not limited to the rotation matrix R below, provided that the attitude information indicates an attitude of the moving body. For example, the attitude estimating section 102 can generate a direction cosine matrix (DCM) with use of a gravitational direction vector and a horizontal direction vector.

[Math. 7]

$$R = \begin{bmatrix} h_x & h_y & h_z \\ s_x & s_y & s_z \\ g_x & g_y & g_z \end{bmatrix} \quad (1)$$

[Flow of Processes Carried Out by Gravitational Direction Estimating Section]

Next, the following description will discuss processes (attitude estimating method) carried out by the gravitational direction estimating section 100, with reference to FIG. 2. FIG. 2 is a flowchart showing an example of processes carried out by the gravitational direction estimating section 100.

First, the gravitational direction estimating section 100 initializes state data held by the gravitational direction estimating section 100, that is, a state vector (gravitational direction vector) and an error variance-covariance matrix of the state vector (S200). In a case where an attitude (state vector) in an initial state is not known (as in many cases), an initial value of the state vector can be an arbitrary value, e.g., $(0,0,1)^T$. The error variance-covariance matrix can be set while taking into consideration uncertainty of a possible state vector.

Next, the gravitational direction estimating section 100 accepts an input of an angular velocity vector from the angular rate sensor 15 (S201) and accepts an input of timing data $\Delta t$ from the timing device 14 (S202). Note that, in a case where the sensors are not synchronized, a time interval of obtaining sensor data of the angular velocity vector is regarded as the timing data $\Delta t$.

Next, the gravitational direction estimating section 100 updates state data based on the angular velocity vector supplied in S201 and the timing data $\Delta t$ supplied in S202 (S203). This update is based on prediction and is carried out by (i) calculating a predicted value of the gravitational direction vector and (ii) overwriting the gravitational direction vector held by the gravitational direction estimating section 100 with the predicted value. Specifically, the gravitational direction estimating section 100 updates the state vector (gravitational direction vector) based on a mathematical formula (2) below.

[Math. 8]

$$\vec{g}_u = \exp([\vec{\omega}]_x \Delta t) \vec{g} \quad (2)$$

In the mathematical formula (2),

[Math. 9]

$$\vec{g}_u$$

indicates a state vector which has been updated (i.e., the predicted value of the gravitational direction vector). Moreover, "exp( )" is an operator for returning an exponential function of a matrix. In

[Math. 10]

$$[\vec{\omega}]_x,$$

an operator given to the angular velocity vector is an operator for obtaining a skew symmetric matrix.

Moreover, the gravitational direction estimating section 100 updates the error variance-covariance matrix based on a mathematical formula (3) below.

[Math. 11]

$$M = \Phi(\Delta t) P_g \Phi(\Delta t)^T + Q \quad (3)$$

In the mathematical formula (3), "M" is an error variance-covariance matrix which has been updated and "$\Phi(\Delta t)$" is exp(F$\Delta t$). Moreover, "F" is a matrix which is a linear element of a prediction update formula in the Kalman filter. Note that a nonlinear matrix is made linear by Taylor expansion up to the first order term in accordance with a framework of an extended Kalman filter. "Q" is a process error variance-covariance matrix.

Next, the gravitational direction estimating section 100 accepts an input of an acceleration vector from the accelerometer 13 (S204). Then, the gravitational direction estimating section 100 updates state data (i.e., a predicted value of the gravitational direction vector and an error variance-covariance matrix of the predicted value) based on mathematical formulae (4) through (6) below by using the acceleration vector as an observation of the gravitational direction vector (unit vector) (S205, gravitational direction estimating step). Note that a unit system of the acceleration vector is dealt with as [G] (which is a unit in which gravitational acceleration of the earth is 1).

[Math. 12]

$$K = M(M+R)^{-1} \quad (4)$$

[Math. 13]

$$P_g = (I-K)M \quad (5)$$

[Math. 14]

$$\vec{g} = \vec{g_u} + K(\vec{d} - \vec{g_u}) \quad (6)$$

In the mathematical formula (4), "K" indicates a Kalman gain and "R" indicates an observation error variance-covariance matrix. In the mathematical formula (5), "I" indicates a unit matrix and "$P_g$" indicates an error variance-covariance matrix which has been updated.

The observation error variance-covariance matrix R is, specifically, a variance-covariance matrix of an error in an observation in the gravitational direction, and the observation is an observation of an acceleration vector. For example, the observation error variance-covariance matrix R is set such that (i) an element in the observation error variance-covariance matrix R is a small value in a case where the attitude estimating device 1 is in a stationary state and (ii) an element in the observation error variance-covariance matrix R is a large value in a case where the moving body is moving (i.e., in a state in which a motion acceleration is applied as a disturbance). For example, in a case where the attitude estimating device 1 is to be worn on a pedestrian, an element of R can be switched between a walking state and a non-walking state. Note that, in such a case, the control section 10 further includes a walking action detecting section for detecting, based on a value of an acceleration vector and/or the like, whether or not the pedestrian is walking. The element of R is switched when a walking action has been detected, and then the element of R is returned when the walking action has not been detected.

After S205 is ended, the process returns to S201. That is, the processes of S201 through S205 are continuously and repeatedly carried out during tracking of an attitude of the moving body, and thus state data of the moving body is sequentially updated in accordance with a latest state of the moving body.

[Flow of Processes Carried Out by Horizontal Direction Estimating Section]

Next, the following description will discuss processes (attitude estimating method) carried out by the horizontal direction estimating section 101, with reference to FIG. 3. FIG. 3 is a flowchart showing an example of processes carried out by the horizontal direction estimating section 101. Note that the processes shown in FIG. 3 utilize calculation results obtained in the processes shown in FIG. 2, and therefore the processes shown in FIG. 3 are carried out after the processes shown in FIG. 2 are ended.

First, the horizontal direction estimating section 101 initializes state data held by the horizontal direction estimating section 101, that is, a state vector (horizontal direction vector) and an error variance-covariance matrix of the state vector (S300). In a case where an attitude (state vector) in an initial state is not known (as in many cases), an initial value of the state vector can be an arbitrary value, e.g., $(1,0,0)^T$. The error variance-covariance matrix can be set while taking into consideration uncertainty of a possible state vector.

Next, the horizontal direction estimating section 101 accepts an input of an angular velocity vector from the angular rate sensor 15 (S301) and accepts an input of timing data Δt from the timing device 14 (S302). Note that, in a case where the sensors are not synchronized, a time interval of obtaining sensor data of the angular velocity vector is regarded as the timing data Δt.

Next, the horizontal direction estimating section 101 updates state data based on the angular velocity vector supplied in S301 and the timing data Δt supplied in S302 (S303). This update is based on prediction and is carried out by (i) calculating a predicted value of the horizontal direction vector and (ii) overwriting the horizontal direction vector held by the horizontal direction estimating section 101 with the predicted value. Specifically, the horizontal direction estimating section 101 updates the state vector (horizontal direction vector) based on a mathematical formula (7) below.

[Math. 15]

$$\vec{h_u} = \exp(|\vec{\omega}|_x \Delta t) \vec{h} \quad (7)$$

In the mathematical formula (7),

[Math. 16]

$$\vec{h_u}$$

indicates a state vector which has been updated (i.e., the predicted value of the horizontal direction vector). Moreover, "exp( )" is an operator for returning an exponential function of a matrix. In

[Math. 17]

$$[\vec{\omega}]_x,$$

an operator given to the angular velocity vector is an operator for obtaining a skew symmetric matrix.

Note that the matrix used in the update of S303 is calculated with a method identical with that used in S203. Therefore, in a case where the same angular velocity vector and the same timing data Δt are supplied, the horizontal direction estimating section 101 can use the matrixes obtained by the gravitational direction estimating section 100 in S203 and can thus omit calculating matrixes of the angular velocity vector and the timing data Δt.

Moreover, the horizontal direction estimating section 101 updates the error variance-covariance matrix based on a mathematical formula (8) below.

[Math. 18]

$$M_h = \Phi(\Delta t) P_h \Phi(\Delta t)^T + Q_h \quad (8)$$

In the mathematical formula (8), "$M_h$" is an error variance-covariance matrix which has been updated and "$\Phi(\Delta t)$" is exp(FΔt). Moreover, "F" is a matrix which is a linear element of a prediction update formula in the Kalman filter. Note that a nonlinear matrix is made linear by Taylor expansion up to the first order term in accordance with a framework of an extended Kalman filter. "$Q_h$" is a process error variance-covariance matrix.

Next, the horizontal direction estimating section 101 accepts an input of a magnetic vector from the magnetometer (S304) and obtains, from the gravitational direction estimating section 100, a gravitational direction vector held by the gravitational direction estimating section 100 (S305). Note that the gravitational direction vector is the gravitational direction vector which is in the sensor coordinate system and has been updated in S205.

Next, the horizontal direction estimating section 101 checks whether or not the magnetic vector accepted in S304 is adequate for use in update of state data (S306). Specifically, the horizontal direction estimating section 101 checks the following two items with use of the magnetic vector and the gravitational direction vector.

(A) Magnitude of magnetic vector
(B) Dip of magnetic vector

In the check of (A), the horizontal direction estimating section 101 determines whether or not magnitude of the magnetic vector obtained in S304 falls within a predetermined error range with respect to magnitude of a geomagnetic vector in an area in which the check is carried out (i.e., an area in which the moving body exists).

In the check of (B), the horizontal direction estimating section 101 calculates a dip of the magnetic vector with use of the magnetic vector obtained in S304 and the gravitational direction vector obtained in S305. Then, the horizontal direction estimating section 101 determines whether or not the dip thus calculated falls within a predetermined error range with respect to a dip of a geomagnetic vector in an area in which the check is carried out (i.e., an area in which the moving body exists).

Note that pieces of data (magnitude of the geomagnetic vector (i.e., total magnetic force) and the dip of geomagnetic vector) which are used in the determinations can be stored in the storage section 11 or the like in advance. For example, it is possible that a database is stored which contains data of magnitude and a dip of a geomagnetic vector in each area, so that data corresponding to a position of the moving body is obtained from the database. Alternatively, these pieces of data can be calculated by arithmetic operation. Alternatively, these pieces of data can be obtained from another device which stores the data or has a function to calculate the data. The same applies to a declination of a geomagnetic vector used in S308 described below.

Next, the horizontal direction estimating section 101 determines whether or not the magnetic vector obtained in S304 passes the check (S307). Specifically, the horizontal direction estimating section 101 determines that the magnetic vector obtained in S304 passes the check in a case where the results of both the checks (A) and (B) fall within the predetermined error ranges, and otherwise determines that the magnetic vector obtained in S304 does not pass the check.

In a case where the horizontal direction estimating section 101 has determined that the magnetic vector obtained in S304 passes the check (YES in S307), the horizontal direction estimating section 101 updates state data (i.e., a predicted value of horizontal direction vector and an error variance-covariance matrix of the predicted value) by using the magnetic vector obtained in S304 as an observation in a reference horizontal direction (S308, horizontal direction estimating step). Specifically, the horizontal direction estimating section 101 updates the state data with use of mathematical formulae (9) through (11) below:

[Math. 19]

$$K = M_h(M_h + R_h)^{-1} \quad (9)$$

[Math. 20]

$$P_h = (I-K)M_h \quad (10)$$

[Math. 21]

$$\vec{h} = \vec{h}_u + K(\vec{m}_h - \vec{h}_u) \quad (11)$$

In the mathematical formula (9), "$R_h$" indicates an observation error variance-covariance matrix. In the mathematical formula (10), "K" indicates a Kalman gain, "I" indicates a unit matrix, and "$P_h$" indicates an error variance-covariance matrix which has been updated.

In the mathematical formula (11),
[Math. 22]

$$\vec{m}_h$$

indicates a horizontal azimuth vector (unit vector) which has been obtained by (i) correcting the magnetic vector so that the magnetic vector becomes perpendicular to the gravitational direction vector and (ii) correcting the magnetic vector by an angle that corresponds to a declination of the geomagnetic vector. By using the magnetic vector thus corrected, it is possible to accurately update the horizontal direction vector.

On the other hand, in a case where the horizontal direction estimating section 101 has determined that the magnetic vector obtained in S304 does not pass the check (NO in S307), the horizontal direction estimating section 101 regards an observation of the magnetic vector as invalid and updates state data based on only prediction (S309). Specifically, the horizontal direction estimating section 101 overwrites state data with values of state data obtained in S303. That is, the following formulae are derived:

[Math. 23]

$$P_h = M_h$$

[Math. 24]

$$\vec{h} = \vec{h}_u$$

In this case, update using the magnetic vector is not carried out, and the state data is not substantially updated.

After any of the processes of S308 and S309, a process of S310 is carried out. In S310, the horizontal direction estimating section 101 corrects the horizontal direction vector, which has been updated in S308 or S309, so that the horizontal direction vector becomes perpendicular to the gravitational direction vector obtained in S305. Specifically, the horizontal direction estimating section 101 calculates a corrected horizontal direction vector based on a mathematical formula (12) below, and holds the corrected horizontal direction vector as a state vector.

[Math. 25]

$$\vec{h}_n = \vec{g} \times \vec{h} \times \vec{g} \quad (12)$$

After S310 is ended, the process returns to S301. That is, the processes of S301 through S310 are continuously and repeatedly carried out during tracking of an attitude of the moving body, and thus state data of the moving body is sequentially updated in accordance with a latest state of the moving body.

[Estimation of Attitude]

As above described, the gravitational direction estimating section 100 sequentially updates state data containing a gravitational direction vector, and the horizontal direction estimating section 101 sequentially updates state data containing a horizontal direction vector. From this, the attitude estimating section 102 obtains the gravitational direction vector from the gravitational direction estimating section 100 and obtains the horizontal direction vector from the horizontal direction estimating section 101 at an arbitrary timing, and generates attitude information indicative of an attitude of the moving body based on the mathematical formula (1) (attitude estimating step). Then, tracking of the attitude of the moving body can be carried out by sequentially estimating the attitude.

[Effect of Reducing Arithmetic Operation Amount]

Each of the gravitational direction vector and the horizontal direction vector which are updated in the attitude estimating device 1 is expressed by a matrix of 3×1, and therefore multiplication carried out in each of the updates is merely for a matrix of 3×3. On the other hand, in the conventional technique as disclosed in Non-patent Literature 1, a state vector which has nine components and is expressed by a matrix of 9×1 is updated, and therefore multiplication of a matrix of 9×9 is carried out in the update.

An arithmetic operation cost of the multiplication of the 9×9 matrix is $3^3=27$ times greater than that of multiplication of the 3×3 matrix. Therefore, even though arithmetic operation costs are considered which are of updates of the gravitational direction vector and the horizontal direction vector, the arithmetic operation cost of the conventional technique is still greater by 27÷2=13.5 times than that of the present invention. As such, according to the attitude estimating device 1, it is possible to increase a speed of arithmetic operation up to 13.5 times, as compared with the conventional technique. Moreover, this increase in speed of arithmetic operation is achieved by (i) focusing on a fact that update of a state vector by using a conventional Kalman filter includes redundancy and (ii) eliminating the redundancy, and therefore accuracy in attitude estimation is equivalent to that of the conventional technique.

[Embodiment 2]

In Embodiment 1, the attitude estimating device 1 has been described which includes the accelerometer 13, the angular rate sensor 15, and the magnetometer 16. Note, however, that the attitude estimating device 1 of the present invention does not necessarily need to include the sensors, provided that the attitude estimating device 1 can obtain results of measurement carried out by the sensors. For example, the attitude estimating device 1 of the present invention can obtain, via wireless communication, measurement results from the sensors which are worn on the moving body. In a case where it is unnecessary to estimate an attitude in real time, it is possible that results of measurement carried out by the sensors are stored in a storage medium and the measurement results are obtained from the storage medium. Similarly, the attitude estimating device 1 of the present invention does not necessarily need to include the timing device 14, and can obtain timing data from a timing device 14 which is provided outside of the attitude estimating device 1.

[Embodiment 3]

In Embodiment 1, the attitude estimating device 1 which outputs attitude information has been described. Note, however, that the scope of the present invention also encompasses a device which calculates and outputs parameters other than attitude information with use of generated attitude information. For example, the scope of the present invention encompasses a positioning device which calculates a current position of the moving body with use of attitude information generated by the method described in Embodiment 1 and a speed of the moving body (which can be calculated from results of measurement carried out by the accelerometer 13). Moreover, the scope of the present invention also encompasses a motion detecting device which detects, based on the attitude information, a motion made by the moving body (e.g., a pedestrian), and a moving speed calculating device which calculates a moving speed of the moving body based on the attitude information.

[Embodiment 4]

In the above embodiments, an angular velocity component among the nine components of a state vector of the Kalman filter in the conventional technique (e.g., Non-patent Literature 1) is not used as the state vector. Note, however, that the angular velocity component can be contained in the state vector.

In this case, a state vector held by the gravitational direction estimating section 100 is expressed by a matrix of 6×1 including six components in total, i.e., gravitational direction components in three axes and angular velocity components in three axes. Similarly, a state vector held by the horizontal direction estimating section 101 is expressed by a matrix of 6×1 including six components in total, i.e., horizontal direction components in three axes and angular velocity components in three axes. Even with such a configuration, it is possible to reduce an arithmetic operation amount for update, as compared with the conventional technique in which a state vector having nine components is updated. Note, however, that, as a result of studies by the inventor of the present invention, the following is found: that is, even in a case where an angular velocity component is not contained in a state vector, an attitude can be estimated with accuracy which is equivalent to that in a case where an angular velocity component is contained in a state vector. Therefore, in view of reducing an arithmetic operation amount, it is preferable that the angular velocity component is not contained in the state vector.

[Example of Configuration Achieved by Software]

A control block (in particular, the control section 10) of the attitude estimating device 1 can be realized by a logic circuit (hardware) provided in an integrated circuit (IC chip) or the like or can be alternatively realized by software as executed by a central processing unit (CPU).

In the latter case, the attitude estimating device 1 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

In order to attain the object, an attitude estimating device of the present invention is an attitude estimating device which (i) sequentially updates a state vector of a moving body in a sensor coordinate system by use of an output from an accelerometer, an output from an angular rate sensor, and an output from a magnetometer and (ii) tracks an attitude of the moving body with use of the state vector, the attitude estimating device including: a gravitational direction estimating section which (i) calculates a predicted value of a gravitational direction vector that is a component of the state vector with use of the output from the angular rate sensor and (ii) updates the predicted value of the gravitational direction vector by using the output from the accelerometer as an observation; a horizontal direction estimating section which (i) calculates a predicted value of a horizontal direction vector that is a component of the state vector with use of the output from the angular rate sensor and (ii) updates the predicted value of the horizontal direction vector by using the output from the magnetometer as an observation; and an attitude estimating section which generates attitude information of the moving body with use of (i) the gravitational direction vector which has been updated and (ii) the horizontal direction vector which has been updated.

According to the configuration, the gravitational direction vector and the horizontal direction vector are separately calculated and updated, and attitude information of the moving body is generated with use of (i) the gravitational direction vector which has been updated and (ii) the horizontal direction vector which has been updated. This makes it possible to reduce an arithmetic operation cost for update, as compared with a case where a state vector containing a gravitational direction vector and a horizontal direction vector is collectively updated, while maintaining estimation accuracy which is equivalent to that of such a case.

It is possible that the horizontal direction estimating section checks whether or not the output from the magnetometer is an adequate value for use in updating the horizontal direction vector; and in a case where the output from the magnetometer is not the adequate value, the horizontal direction estimating section does not carry out update by using the output of the magnetometer as the observation.

According to the configuration, in a case where the output from the magnetometer is not the adequate value for use in update of the horizontal direction vector as a result of the check, the horizontal direction estimating section does not carry out update by using the output from the magnetometer as the observation. This makes it possible to prevent update from being carried out with use of an inadequate output of the magnetometer and thus prevent decrease in accuracy of estimating an attitude.

It is possible that the horizontal direction estimating section checks whether or not the output from the magnetometer is the adequate value with use of the gravitational direction vector which has been updated by the gravitational direction estimating section.

According to the configuration, the check is carried out with use of the gravitational direction vector which has been updated by the gravitational direction estimating section. This gravitational direction vector has been calculated based on prediction obtained by using an output from the angular rate sensor and has been updated by using an output from the accelerometer as an observation, and therefore the gravitational direction vector is highly likely to accurately indicate the gravitational direction. Moreover, unless the magnetic vector which is an output from the magnetometer contains disturbance or distortion, a predetermined relation holds true between the magnetic vector and the gravitational direction. Therefore, in a case where the relation holds true, the output from the magnetometer is an adequate value, whereas in a case where the relation does not hold true, the output from the magnetometer is an inadequate value. Therefore, according to the configuration, it is possible to carry out check with high accuracy by using the gravitational direction vector which has been updated by the gravitational direction estimating section.

It is possible that the horizontal direction estimating section corrects the horizontal direction vector, which has been updated, so that the horizontal direction vector becomes perpendicular to the gravitational direction vector which has been updated.

Here, the horizontal direction vector and the gravitational direction vector are vectors in the same sensor coordinate system, and are therefore perpendicularly intersect each other in theory. However, there is a case where a horizontal direction vector and a gravitational direction vector which are actually updated by arithmetic operation do not perpendicularly intersect each other. In such a case, accuracy in estimating an attitude decreases if the estimation is carried out in the state where the horizontal direction vector and the gravitational direction vector do not perpendicularly intersect each other. In view of this, according to the configuration, the horizontal direction vector which has been updated is corrected so as to become perpendicular to the gravitational direction vector which has been updated. From this, it is possible to prevent decrease in accuracy of estimating an attitude.

In order to attain the object, an attitude estimating method of the present invention is an attitude estimating method which is carried out by use of an attitude estimating device which (i) sequentially updates a state vector of a moving body in a sensor coordinate system by use of an output from an accelerometer, an output from an angular rate sensor, and an output from a magnetometer and (ii) tracks an attitude of the moving body with use of the state vector, the attitude estimating method including: a gravitational direction estimating step of (i) calculating a predicted value of a gravitational direction vector that is a component of the state vector with use of the output from the angular rate sensor and (ii) updating the predicted value of the gravitational direction vector by using the output from the accelerometer as an observation; a horizontal direction estimating step of (i) calculating a predicted value of a horizontal direction vector that is a component of the state vector with use of the output from the angular rate sensor and (ii) updating the predicted value of the horizontal direction vector by using the output from the magnetometer as an observation; and an attitude estimating step of generating attitude information of the moving body with use of (i) the gravitational direction vector which has been updated and (ii) the horizontal direction vector which has been updated. According to the method, it is possible to bring about an effect similar to that of the attitude estimating device.

The attitude estimating device in accordance with each of the aspects of the present invention can be realized by a computer. In such a case, the present invention encompasses (i) a control program which causes a computer to serve as the sections (software elements) of the attitude estimating device so that the attitude estimating device can be realized by the computer and (ii) a computer-readable storage medium which stores the control program.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1: Attitude estimating device
13: Accelerometer
15: Angular rate sensor
16: Magnetometer
100: Gravitational direction estimating section
101: Horizontal direction estimating section
102: Attitude estimating section

The invention claimed is:
1. An attitude estimating device which (i) sequentially updates a state vector of a moving body in a sensor coordinate system by use of an output from an accelerometer, an output from an angular rate sensor, and an output from a magnetometer and (ii) tracks an attitude of the moving body with use of the state vector, said attitude estimating device comprising:

a processor;

a memory in electronic communication with the processor;

the processor (i) calculates a predicted value of a gravitational direction vector that is a component of the state vector with use of the output from the angular rate sensor and (ii) updates the predicted value of the gravitational direction vector by using the output from the accelerometer as an observation;

the processor (i) calculates a predicted value of a horizontal direction vector that is a component of the state vector with use of the output from the angular rate sensor and (ii) updates the predicted value of the horizontal direction vector by using the output from the magnetometer as an observation; and the processor generates attitude information of the moving body with use of (i) the gravitational direction vector which has been updated and (ii) the horizontal direction vector which has been updated.

2. The attitude estimating device as set forth in claim 1, wherein:

the processor checks whether or not the output from the magnetometer is an adequate value for use in updating the horizontal direction vector; and in a case where the output from the magnetometer is not the adequate value, the processor does not carry out update by using the output of the magnetometer as the observation.

3. The attitude estimating device as set forth in claim 2, wherein:

the processor checks whether or not the output from the magnetometer is the adequate value with use of the gravitational direction vector which has been updated.

4. The control method of claim 1, wherein the cessation is momentary.

5. The control method of claim 1, wherein the cessation is sustained.

6. A non-transitory computer-readable storage medium which stores a control program for causing a computer to carry out following steps:

a gravitational direction estimating step of (i) calculating a predicted value of a gravitational direction vector that is a component of a state vector of a moving body in a sensor coordinate system with use of the output from an angular rate sensor and (ii) updating the predicted value of the gravitational direction vector by using the output from an accelerometer as an observation;

a horizontal direction estimating step of (i) calculating a predicted value of a horizontal direction vector that is a component of the state vector with use of the output from the angular rate sensor and (ii) updating the predicted value of the horizontal direction vector by using the output from a magnetometer as an observation; and an attitude estimating step of generating attitude information of the moving body with use of (i) the gravitational direction vector which has been updated and (ii) the horizontal direction vector which has been updated.

* * * * *